United States Patent
Keagy et al.

(10) Patent No.: US 9,965,263 B2
(45) Date of Patent: May 8, 2018

(54) CLOUD ORCHESTRATION ENGINE

(71) Applicant: GoGrid, LLC, San Francisco, CA (US)

(72) Inventors: John M. Keagy, San Francisco, CA (US); Mark W. Worsey, Pleasanton, CA (US); Heather A. McKelvey, San Francisco, CA (US)

(73) Assignee: GoGrid, LLC, Jersey City, NJ (US)

( * ) Notice: Subject to any disclaimer, the term of this patent is extended or adjusted under 35 U.S.C. 154(b) by 345 days.

(21) Appl. No.: 14/727,815

(22) Filed: Jun. 1, 2015

(65) Prior Publication Data

US 2015/0381411 A1 Dec. 31, 2015

Related U.S. Application Data

(60) Provisional application No. 62/006,880, filed on Jun. 2, 2014.

(51) Int. Cl.
| | |
|---|---|
| *G06F 15/16* | (2006.01) |
| *G06F 9/445* | (2018.01) |
| *G06F 9/455* | (2018.01) |
| *H04L 12/24* | (2006.01) |

(52) U.S. Cl.
CPC ............ *G06F 8/61* (2013.01); *G06F 9/45533* (2013.01); *H04L 41/5054* (2013.01); *H04L 41/5058* (2013.01); *H04L 41/5038* (2013.01); *H04L 41/5096* (2013.01)

(58) Field of Classification Search
CPC ... G06F 8/61; G06F 9/45533; H04L 41/5054; H04L 41/5058; H04L 41/5038; H04L 41/5096
See application file for complete search history.

(56) References Cited

U.S. PATENT DOCUMENTS

| | | | | |
|---|---|---|---|---|
| 8,448,170 B2 * | 5/2013 | Wipfel | ................. | H04L 9/3213 718/1 |
| 2011/0126207 A1 * | 5/2011 | Wipfel | ................. | H04L 9/3213 718/104 |
| 2013/0239089 A1 * | 9/2013 | Eksten | ...................... | G06F 8/70 717/120 |
| 2014/0068560 A1 * | 3/2014 | Eksten | ................. | G06F 9/5066 717/120 |

* cited by examiner

*Primary Examiner* — Moustafa M Meky
*Assistant Examiner* — Andrea Hurst
(74) *Attorney, Agent, or Firm* — Sterne, Kessler, Goldstein & Fox P.L.L.C.

(57) ABSTRACT

An orchestration engine that interfaces with the various clouds to implement the system solution. The orchestration engine builds, configures, and converges the single system solution. The orchestration engine builds the system by instantiating machines and services on the various clouds. The orchestration engine configures the system according to input from the client and the solution provider and then converges the various systems by establishing relationships and connections between the various services. Optionally, the orchestration engine also runs tests to verify that the system is working properly. Once the system has been built, configured and converged, the orchestration engine provides the client with a single entry point for using the system solution.

21 Claims, 6 Drawing Sheets

CLOUD ORCHESTRATION ENGINE

BACKGROUND

Many services are provided in the cloud, each service with different strengths and weaknesses. In order to develop and implement a cloud-based system solution, it is often necessary to configure various cloud services according to a user's specifications. The various cloud services must then be configured to interact with each other in the cloud.

BRIEF SUMMARY

Some embodiments of the invention provide a single system solution composed of multiple clouds and technologies. The system solution of some embodiments is provided on-demand. For example, a solution provider may offer a system solution composed of various different clouds to several potential clients. Manually building each system after a potential client expresses interest would be time-consuming and slow. Building solutions for every potential client could have significant resource costs as resources are reserved on the various different clouds and time costs as each installation is further customized for each client.

In order to orchestrate the use of various clouds to provide an on-demand system solution, some embodiments provide an orchestration engine that interfaces with the various clouds to implement and configure the system solution. The system solution of some embodiments includes configurations for a combination of different clouds, connections schema for connections and interactions between the clouds, and an order in which the clouds are to be implemented. The orchestration engine of some embodiments instantiates the system solution by building infrastructure, installing and configuring software and services, and converging the various clouds to provide the system solution.

The orchestration engine builds the infrastructure by instantiating machines and services on the various clouds. The orchestration engine installs and configures the software and services on the machines. The orchestration engine then converges the various clouds by establishing relationships and connections between the various services. In some embodiments, the orchestration engine also runs tests to verify that the system is working properly. Once the system has been built, installed, configured, and converged, the client is provided with a single entry point for using the system solution without ever logging into a website or portal.

In some embodiments, in addition to providing an on-demand system solution, the orchestration engine provides a simplified interface for a client wishing to instantiate a system solution. The orchestration engine of some embodiments provides an invitation to a potential client, and when the client provides an initiation response (e.g., through email or a website), the orchestration engine instantiates the system solution and provides the client with prompt access to the desired system solution.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1A:
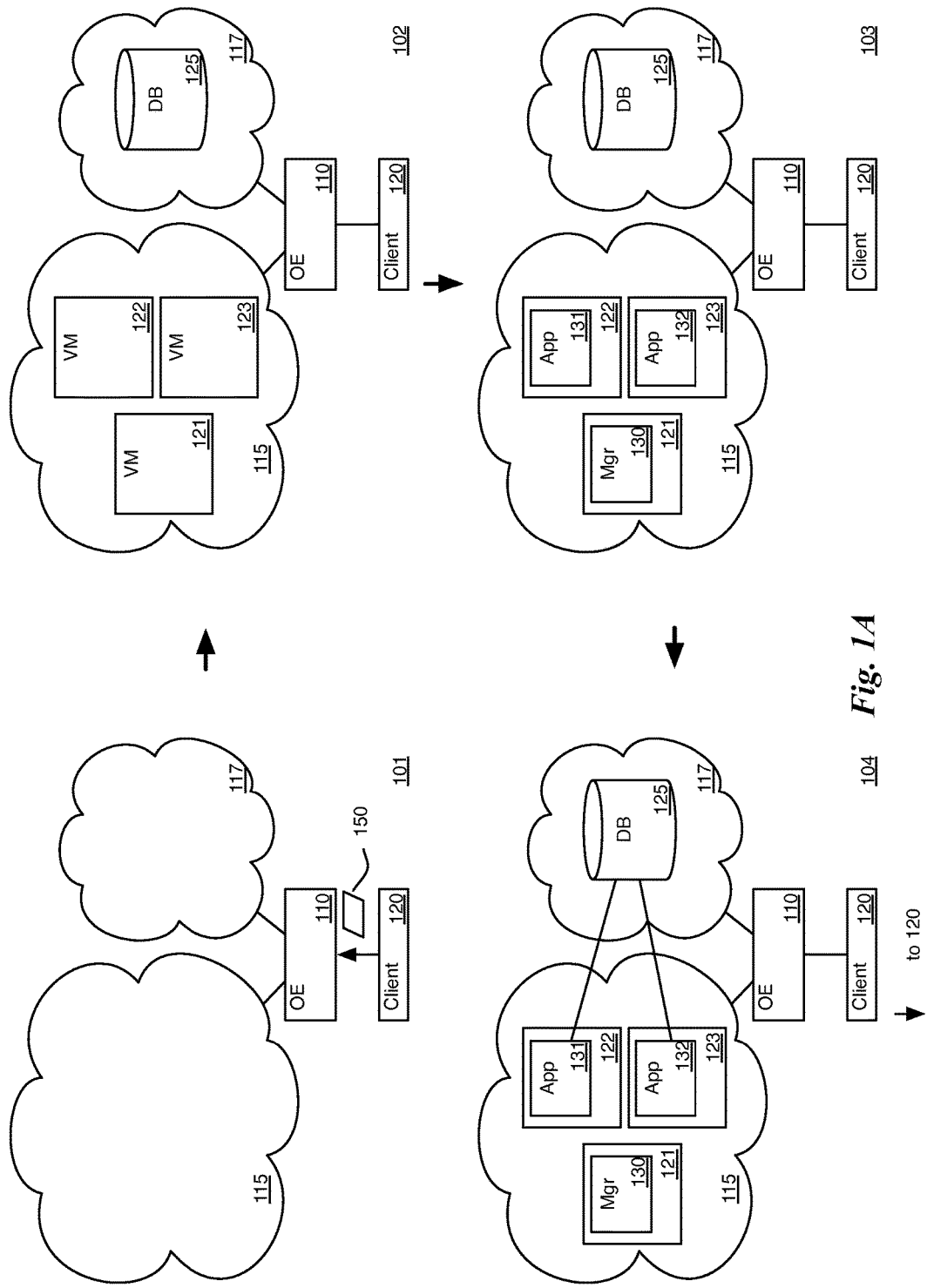
FIGS. 1A-B illustrate an example of instantiating a system solution using an orchestration engine.

In the following detailed description of the invention, numerous details, examples, and embodiments of the invention are set forth and described. However, it will be clear and apparent to one skilled in the art that the invention may be practiced without some of the specific details and examples discussed.

Some embodiments of the invention provide a single system solution composed of multiple clouds and technologies. The system solution of some embodiments is provided on-demand. For example, a solution provider may offer a system solution composed of various different clouds to several potential clients. Manually building each system after a potential client expresses interest would be time-consuming and slow. Building solutions for every potential client could have significant resource costs as resources are reserved on the various different clouds and time costs as each installation is further customized for each client.

In order to orchestrate the use of various clouds to provide an on-demand system solution, some embodiments provide an orchestration engine that interfaces with the various clouds to implement and configure the system solution. The system solution of some embodiments includes configurations for a combination of different clouds, connections schema for connections and interactions between the clouds, and an order in which the clouds are to be implemented. The orchestration engine of some embodiments instantiates the system solution by building infrastructure, installing and configuring software and services, and converging the various clouds to provide the system solution.

The orchestration engine builds the infrastructure by instantiating machines and services on the various clouds. The orchestration engine installs and configures the software and services on the machines. The orchestration engine then converges the various clouds by establishing relationships and connections between the various services. In some embodiments, the orchestration engine also runs tests to verify that the system is working properly. Once the system has been built, installed, configured, and converged, the client is provided with a single entry point for using the system solution without ever logging into a website or portal.

In some embodiments, in addition to providing an on-demand system solution, the orchestration engine provides a simplified interface for a client wishing to instantiate a system solution. The orchestration engine of some embodiments provides an invitation to a potential client, and when the client provides an initiation response (e.g., through email or a website), the orchestration engine instantiates the system solution and provides the client with prompt access to the desired system solution.

I. Instantiating a System Solution

The orchestration engine of some embodiments instantiates a system solution to provide a multi-cloud, multi-technology, on-demand solution to a client. In order to instantiate the system solution, the orchestration engine of some embodiments builds up an infrastructure, installs and configures software and services on the infrastructure, and connects or converges services and technologies of the different clouds to instantiate a single system solution.

Figure 1B:
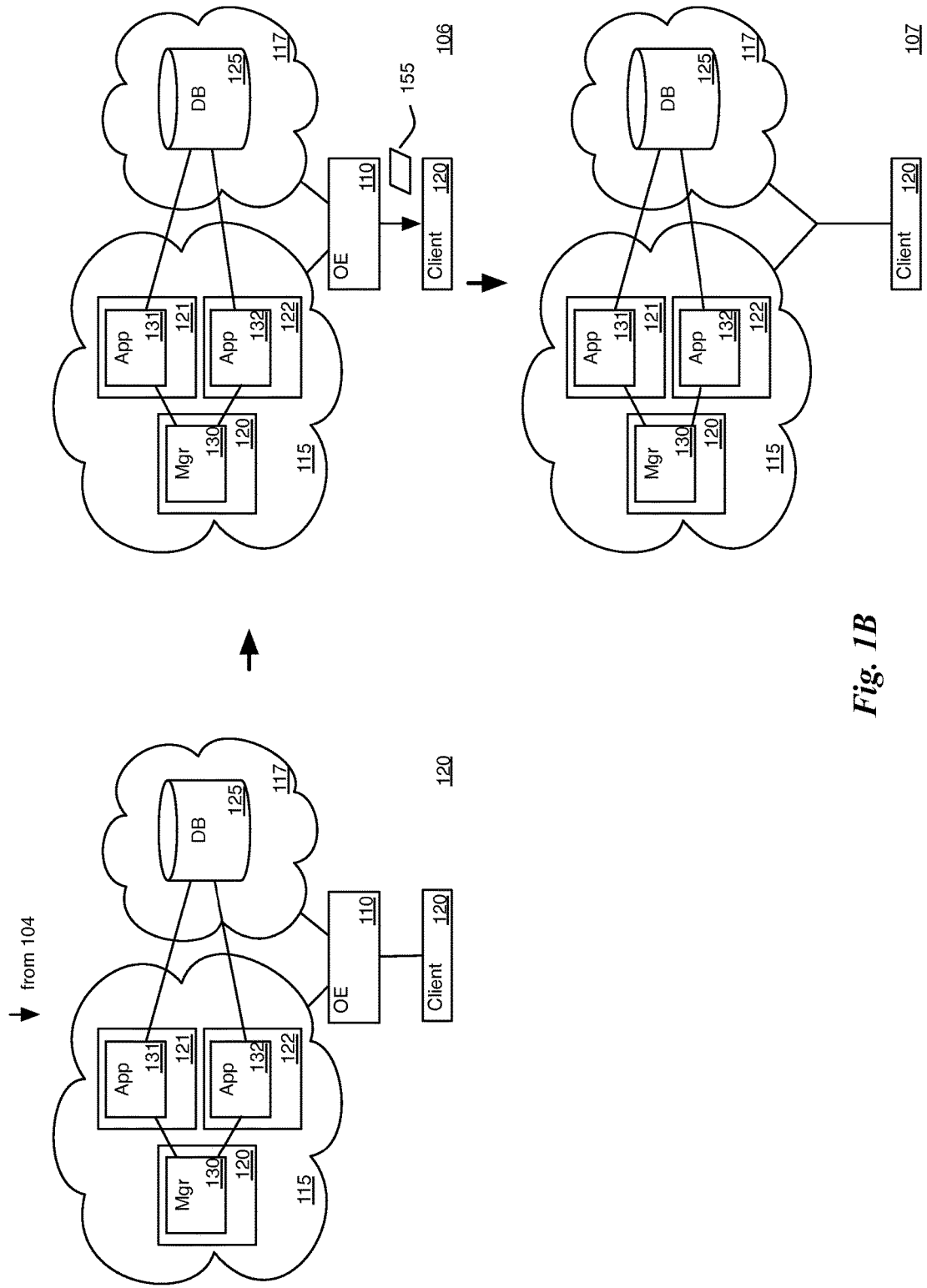

FIGS. 1A-1B illustrate an example of building infrastructure, installing and configuring software and services, and connecting or converging the different clouds to instantiate a system solution in seven stages 101-107. The first stage 101 shows an orchestration engine 110, clouds 115 and 117, and a client 120. In the first stage 101, nothing has yet been instantiated in the clouds 115 and 117 for the particular client.

The first stage 101 also shows that the orchestration engine 110 receives a request 150 to install a system solution from a client 120. The request 150 may be received through various methods (e.g., a user interface (UI), an API call, etc.). For example, in some embodiments, a solution provider uses the orchestration engine to send an invitation to a potential client 120 for a particular system solution in an email with a uniform resource locator (URL). When the potential client 120 clicks on the URL, an API request is sent to the orchestration engine 110 to instantiate a new installation of the desired system solution, using multiple, different clouds 115 and 117.

Once the request 150 to instantiate the system solution is received, the orchestration engine 110 of some embodiments begins building infrastructure for the system solution. In the second stage 102, the orchestration engine 110 builds out infrastructure for the system solution by instantiating three VMs 121-123 in cloud 115 and one database 125 in cloud 117. Building the infrastructure may include many different operations, such as instantiating a network of virtual machines (VMs) on a particular cloud, creating databases, or creating accounts for a user to access particular services from other clouds. For purposes of explanation, a simple example with two clouds is described, but one skilled in the art will recognize that many different services can be provided using different clouds.

Once the infrastructure has been built, the orchestration engine 110 of some embodiments installs and configures software and services. The third stage 103 illustrates that application software 131 and 132 has been installed on VMs 122 and 123, while manager software 130 has been installed on VM 121. Installing and configuring the different portions may include installing software to support the system solution or otherwise configuring the clouds to provide functionality. The system solution is often not a single application, but a suite of various services and software maintained across multiple different clouds that are combined to provide the system solution for the user.

In the fourth and fifth stages 104 and 105 of FIGS. 1A and 1B, the orchestration engine 110 converges the installed components of the clouds 115 and 117. Converging the various clouds ensures that each component (e.g., a VM, a database, etc.) of each cloud is able to communicate with other components, either within the same cloud or from a different cloud, in order to implement the system solution. In the fourth stage 104, the orchestration engine 110 creates connections between the application software 131 and 132 and the database 125 of cloud 117.

In some cases, it is necessary for the different actions of the orchestration engine to be performed in a certain order. The orchestration engine of some embodiments will determine a plan to choreograph the different steps for instantiating the desired system solution. In the example of FIG. 1, the manager software 130 on VM 121 must wait until the connections between application software 131 and 132 and the database 125 are established before creating its own connections to the application software 131 and 132. In the fifth stage 105, the orchestration director 110 determines that the connections for the application software 131 and 132 have been made and creates connections from the manager software 130 to the application software 131 and 132.

In some embodiments, the orchestration engine 110 also verifies each step of the process. For example, the orchestration engine 110 of some embodiments will verify that the three VMs 121-123 have been instantiated, that the application and manager software 130-132 on the VMs 121-123 have been properly installed and configured, and that the VMs 121-123 of cloud 115 are able to access the database 125 of cloud 117.

In the sixth stage 106, the instantiation of the system solution (composed of clouds 115 and 117) is completed. The orchestration engine 110 of some embodiments, after the instantiation is completed, sends a response 155 back to the potential user, informing the client 120 that the requested system solution is ready for use and providing a simple access point to the system solution. In some embodiments, the response 155 also includes information and instructions on usage of the application. In the seventh stage 107, the client 120 is now connected to the system solution with clouds 115 and 117. In some embodiments, when the client 120 first accesses the system solution, the orchestration engine 110 provides results of a series of system tests to verify that the solution was installed successfully.

II. Orchestration Engine

The orchestration engine provides on-demand instantiation of a system solution using multiple different clouds, converging the different clouds to provide a single system solution. In order to provide on-demand instantiation of a system solution that includes multiple different clouds, the orchestration engine performs several different functions.

Figure 2:
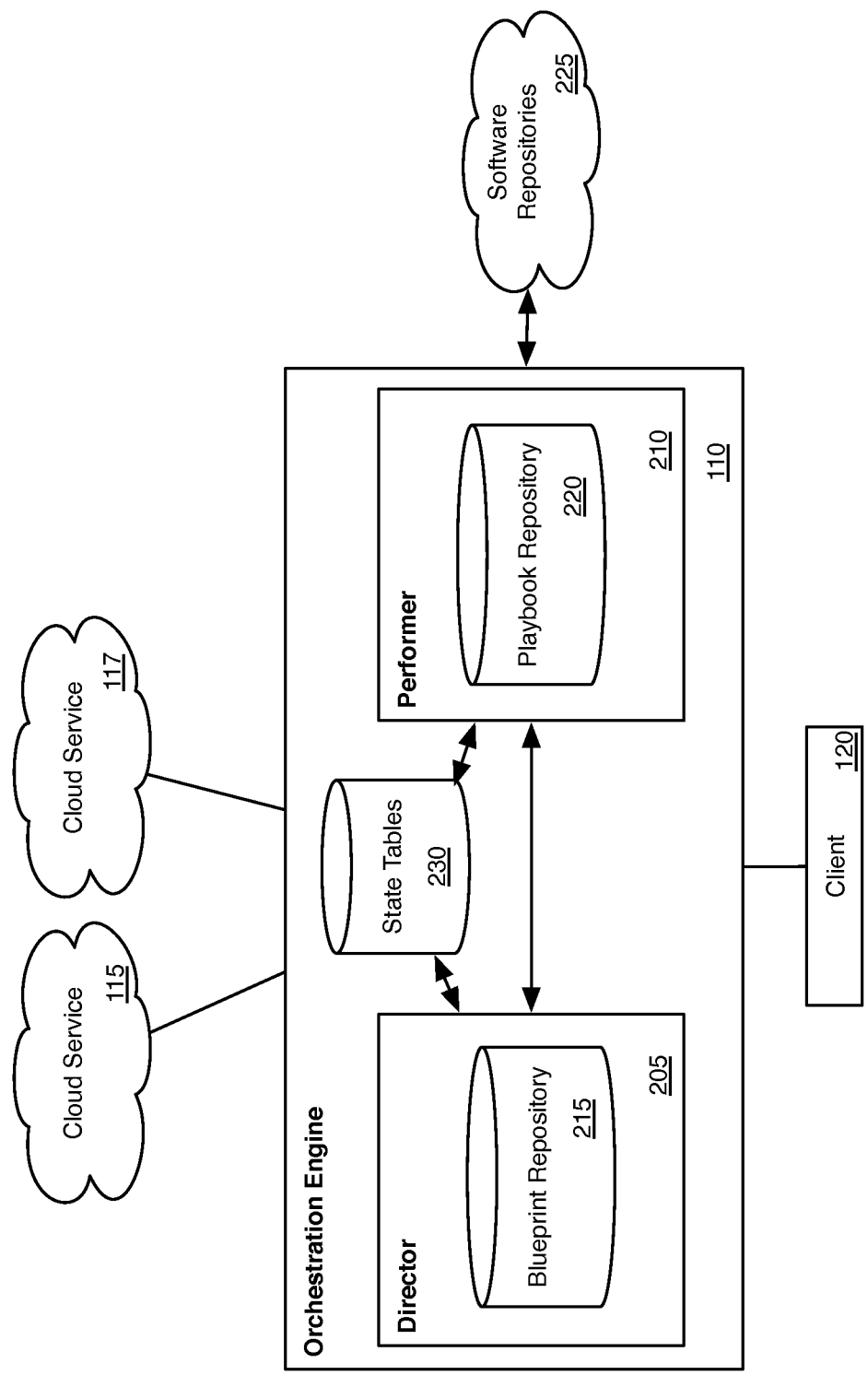
FIG. 2 illustrates an example of components of an orchestration engine.

FIG. 2 illustrates an example of components of an orchestration engine. Similar to FIG. 1, the figure illustrates an orchestration engine 110, a client 120, and clouds 115 and 117. This figure also illustrates software repositories 225. In addition, the orchestration engine 110 includes a director 205, a performer 210, and a state table 230. The director 205 oversees the performer 210 to build infrastructure, install software, and connect or converge the different clouds to instantiate a single system solution.

Once the infrastructure is built, the performer 210 of some embodiments installs and configures the different portions of the system solution. In some embodiments, the director 205 builds a plan (or blueprint) to orchestrate the building, installing, and converging across the clouds when instantiating a system solution. Blueprints provide instructions for performing various functions to instantiate a system solution based on the dependencies between the various clouds and software installations. The plan (or blueprint) of some embodiments includes various information, such as infrastructure requirements (e.g., VMs, servers, databases, etc.), software to be installed on various machines or VMs, and connections to be made between the various services. In order to ensure that the different services are able to interact properly, the director 205 of some embodiments verifies that each step of the installation completes properly and maintains state for the installation in a state table 230.

The director 205 includes a blueprint repository 215. The blueprint repository 215 represents a set of storages for storing blueprints that can be used to instantiate different system solutions. The blueprint repository 215 may include a local storage, a storage that is accessed over a network (e.g., the Internet, a local area network (LAN), etc.), or a combination of different types of storages.

In some embodiments, the blueprint repository 215 stores a set of blueprints for different system solutions. A service provider can use existing blueprints to instantiate a system solution, modify an existing blueprint in the blueprint repository, or create a new blueprint in the blueprint repository 215. The orchestration engine 110 of some embodiments provides a blueprint ID for new blueprints. The new blueprint ID can then be used to select the blueprint for a new installation (e.g., by configuring the new blueprint with client information).

Once the blueprint is selected, the director 205 executes the blueprint by sending instructions to the performer 210. In some embodiments, the blueprint is divided into multiple steps or sections, and the director 205 instructs the performer 210 to implement each section by identifying a playbook for the performer 210 to execute. A playbook in some embodiments is a script (e.g., an Ansible or Salt script) used to configure or install resources on the various clouds. For example, a playbook may instantiate a number of VMs on a particular cloud, download software to be installed on the VMs, and configure the installed software. The selected playbook of some embodiments provides a location (e.g., a Git repository) from which to retrieve the software that is to be installed, as well as configuration information for the installation.

The performer 210 of some embodiments receives the instructions from the director 205 and retrieves a playbook to be executed from a playbook repository 220 as well as any necessary software installation packages from the software repositories 225. Although playbook repository 220 is shown as a local repository and software repository 225 is shown as an external repository, like the blueprint repository 215, the playbook repository 220 and software repositories 225 may be storages that are either stored locally or accessed over a network (e.g., the Internet, a LAN, etc.). The performer 210 then communicates with the various clouds to execute each playbook. Once the performer 210 completes executing a playbook, the director 205 of some embodiments verifies that there aren't any errors before continuing to a next section.

It should be clear to one skilled in the art that the responsibilities of the Director and Performer may be distributed differently. For example, in some embodiments, the Director configures the blueprint and provides it to the Performer, but does not oversee the execution of the blueprint. In some embodiments, the Director provides each set of instructions for execution by the Performer and waits for confirmation from the Performer before providing additional build, configure, and/or converge instructions.

In addition to the director 205 and the performer 210, the orchestration engine 110 may also include a state table 230 for maintaining the state of the instantiation. The state table 230 of some embodiments stores various state information for a system solution installation and tracks the state of different portions of the installation in order to choreograph the interactions between the different software installations and clouds. For example, in some embodiments, the orchestration engine 110 uses the state information in state table 230 to ensure that certain secondary services are not made active until primary services are up and running. The operation of the orchestration engine will be described in further detail below in Section III with reference to FIGS. 3 and 4.

III. Operation

Figure 3:
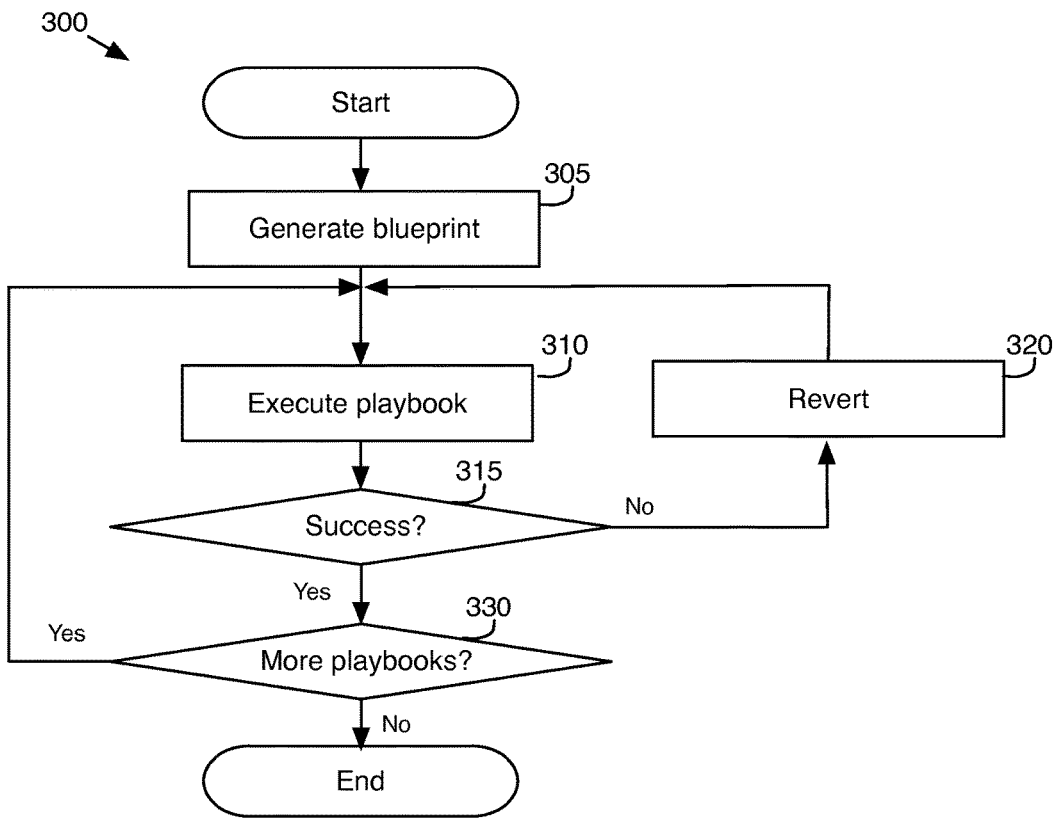
FIG. 3 conceptually illustrates a process for instantiating a system solution.

FIG. 3 conceptually illustrates a process 300 of some embodiments for instantiating a system solution with an orchestration engine. In some embodiments, the process 300 is performed by an orchestration engine as described above with reference to FIG. 2. FIG. 3 will be described with reference to FIG. 4 below. Process 300 begins by generating (at 305) a blueprint for managing the instantiation of a system solution.

Figure 4:
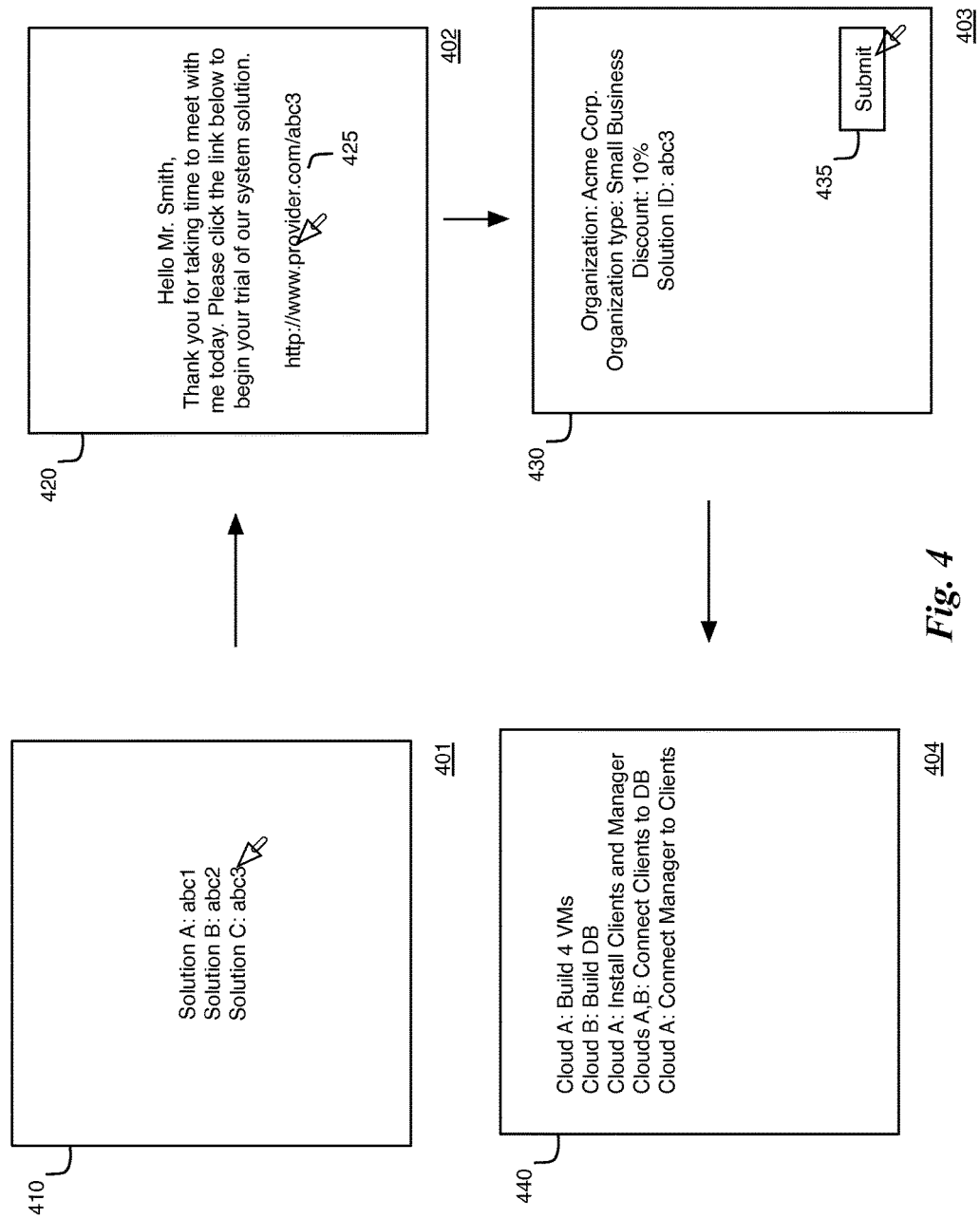
FIG. 4 illustrates an example of generating a blueprint for a system solution.

FIG. 4 illustrates an example of generating a blueprint for a system solution in four stages 401-404. The first stage 401 shows an interface 410 for generating an invitation to a potential client. A service provider may select one of many different blueprints stored in a blueprint repository and generate a promo code or other form of ID that can be sent to the potential client (e.g., in a URL). In the first stage 401, blueprint C, with promo code abc3, was selected from interface 410 to be sent to a potential client.

The second stage 402 illustrates an email 420 sent to the potential client, inviting the client to try a system solution. In some embodiments, other methods are used to provide the potential client with an invitation to the system solution (e.g., a website, promotional advertisement, etc.). The email shows a link, or uniform resource locator (URL) 425, with the promo code identified in the first stage 401.

The third stage 403 illustrates a short form 430 that is presented to the user after the potential client follows the URL 425 in the email 420 of stage 402. In some embodiments, the potential client is directed to a website or otherwise provided with a form to request additional information before sending the information along with the request back to the orchestration engine. The additional information may include identification information (e.g., name, company name, etc.) or configuration information (e.g., number of users, requested functionality, etc.). The short form 430 of some embodiments also includes pre-populated information (e.g., the system solution ID, a discount, etc.).

The fourth stage 404 illustrates a blueprint 440 that is further configured to instantiate a system solution based on the input form 430. In some embodiments, the blueprint outlines a series of scripts (e.g., Ansible, Salt, etc.) that can be used for remote installations and configuration of various software. In addition to determining what must be installed, the blueprint of some embodiments further describes an order for the installation to ensure that the installations are properly choreographed to maintain dependencies between the various services and software installations on the various clouds.

A blueprint contains metadata about the system solution for building infrastructure, installing services, and converging the services to instantiate a system solution. The metadata may include Infrastructure as a Service (IaaS) data such as a cloud name, virtual machine (VM) data (e.g., type, number, size, etc.), storage data, and/or software defined network (SDN) data (e.g., firewalls, load balancers, etc.). In some embodiments, the blueprint is generated by the director of the orchestration engine. In other embodiments, a blueprint is generated for the client, but the blueprint is further configured based on information received from the client (e.g., when the client registers for a service).

Referring back to FIG. 3, once the process 300 has generated (at 305) the blueprint for a system solution, the process 300 executes the blueprint by executing a series of playbooks. As described above, in some embodiments, a playbook is a script that performs a part of the build, install, or converge of a blueprint. The process 300 executes (at 310) a playbook. In some embodiments, executing the playbook includes downloading software from a software repository, as well as installing and configuring the software.

When execution of the playbook has completed, the process 300 of some embodiments determines (at 315) whether the playbook completed successfully. Determining whether a playbook has completed successfully may include determining whether the correct number of VMs were instantiated, that software is correctly installed and configured, or that connections between the clouds are active.

When the process 300 determines (at 315) that the playbook did not complete successfully, the process reverts (at 320) back to a state prior to the failed playbook. In some embodiments, the process refers to a state table to identify a prior state to which to revert. In some embodiments, the process 300 then returns to step 310 to try the playbook again. Alternatively or conjunctively, the process 300 logs the errors to be addressed manually.

When the process 300 determines (at 315) that the playbook did complete successfully, the process determines (at 330) whether any more playbooks need to be executed as a part of the blueprint. When the process determines (at 330) that there are more playbooks to be executed, the process 300 returns to step 310, which is described above. When the process determines (at 330) that there are no more playbooks to execute, the process ends.

IV. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. "Computer" is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 5:
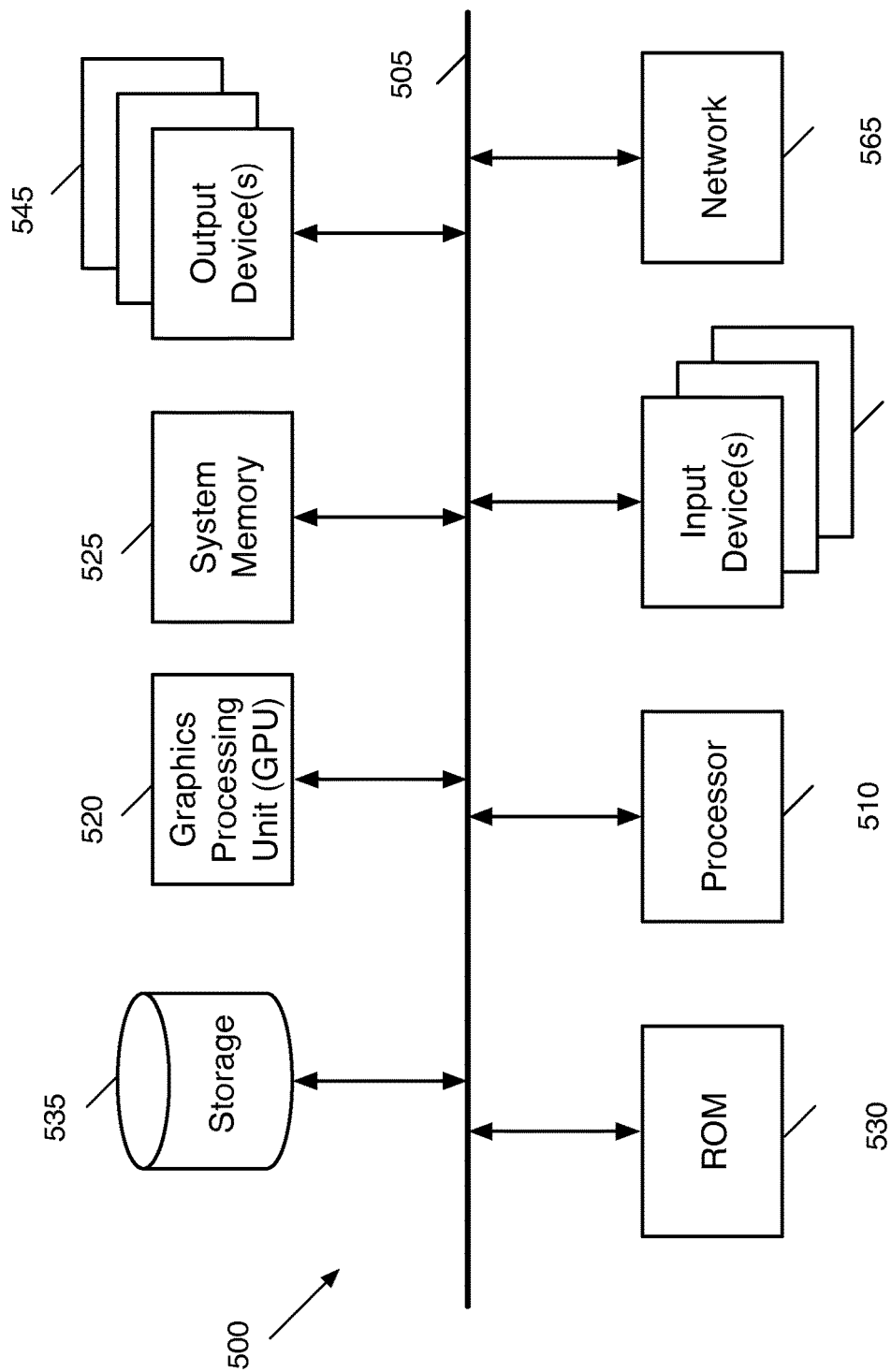
FIG. 5 conceptually illustrates a computer system with which some embodiments of the invention are implemented.

FIG. 5 illustrates a computer system with which some embodiments of the invention are implemented. Such a computer system includes various types of computer readable media and interfaces for various other types of computer readable media. Computer system 500 includes a bus 505, at least one processing unit (e.g., a processor) 510, a graphics processing unit (GPU) 520, a system memory 525, a read-only memory 530, a permanent storage device 535, input devices 540, and output devices 545.

The bus 505 collectively represents all system, peripheral, and chipset buses that communicatively connect the numerous internal devices of the computer system 500. For instance, the bus 505 communicatively connects the processor 510 with the read-only memory 530, the GPU 520, the system memory 525, and the permanent storage device 535.

From these various memory units, the processor 510 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 520. The GPU 520 can offload various computations or complement the image processing provided by the processor 510.

The read-only-memory (ROM) 530 stores static data and instructions that are needed by the processor 510 and other modules of the computer system. The permanent storage device 535, on the other hand, is a read-and-write memory device. This device is a non-volatile memory unit that stores instructions and data even when the computer system 500 is off. Some embodiments of the invention use a mass storage device (such as a magnetic or optical disk and its corresponding disk drive) as the permanent storage device 535.

Other embodiments use a removable storage device (such as a floppy disk, flash drive, or ZIP® disk, and its corresponding disk drive) as the permanent storage device. Like the permanent storage device 535, the system memory 525 is a read-and-write memory device. However, unlike storage device 535, the system memory is a volatile read-and-write memory such as a random access memory. The system memory stores some of the instructions and data that the processor needs at runtime. In some embodiments, the invention's processes are stored in the system memory 525, the permanent storage device 535, and/or the read-only memory 530. For example, the various memory units include instructions for processing multimedia items in accordance with some embodiments. From these various memory units, the processor 510 retrieves instructions to execute and data to process in order to execute the processes of some embodiments.

The bus 505 also connects to the input and output devices 540 and 545. The input devices enable the user to communicate information and commands to the computer system. The input devices 540 include alphanumeric keyboards and pointing devices (also called "cursor control devices"). The output devices 545 display images generated by the computer system. The output devices include printers and display devices, such as cathode ray tubes (CRT) or liquid crystal displays (LCD).

Finally, as shown in FIG. 5, bus 505 also couples the computer 500 to a network 565 through a network adapter (not shown). In this manner, the computer can be a part of a network of computers (such as a local area network ("LAN"), a wide area network ("WAN"), an intranet, or a network of networks such as the Internet. Any or all components of computer system 500 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by a device such as an electronics device, a microprocessor, a processor, a multi-processor (e.g., a chip with several processing units on it) and includes sets of instructions for performing various operations. The computer program excludes any wireless signals, wired download signals, and/or any other ephemeral signals Examples of hardware devices configured to store and execute sets of instructions include, but are not limited to, application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the Figures (including FIG. 3) conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium for storing a program which when executed by at least one processing unit orchestrates an instantiation of a system solution on a plurality of clouds, the program comprising sets of instructions for:
   receiving a request from a user for the system solution;
   generating a blueprint, the blueprint comprising a plurality of steps for instantiating the system solution on the plurality of clouds, the blueprint further comprising a connection schema associated with the plurality of clouds, the connection schema defining connections and interactions to be made between the plurality of clouds;
   for each step of the plurality of steps, executing the step on at least one of the plurality of clouds, wherein executing at least one step comprises converging a first cloud of the plurality of clouds and a second cloud of the plurality of clouds such that at least one first component of the first cloud is configured to directly communicate with at least one second component of the second cloud, and wherein the converging is determined based at least in part on the connection schema; and
   providing the user with access to the system solution.

2. The non-transitory machine readable medium of claim 1, wherein the plurality of steps comprises a first set of steps for instantiating a set of virtual machines on at least one cloud of the plurality of clouds.

3. The non-transitory machine readable medium of claim 2, wherein the plurality of steps further comprises a second set of steps for installing software on the set of virtual machines.

4. The non-transitory machine readable medium of claim 3, wherein the plurality of steps further comprises a third set of steps for configuring the installed software.

5. The non-transitory machine readable medium of claim 1, wherein the plurality of steps comprises a set of steps for creating connections between the first cloud with the second cloud.

6. The non-transitory machine readable medium of claim 5, wherein the connections are between virtual machines instantiated on the first and second clouds.

7. The non-transitory machine readable medium of claim 1, wherein the set of instructions for executing the step comprises sets of instructions for:
   retrieving an installation script for installing a set of software from a script repository; and
   using the installation script to install the set of software on a virtual machine on a cloud of the plurality of clouds.

8. The non-transitory machine readable medium of claim 7, wherein the set of instructions for executing the step further comprises a set of instructions for retrieving installation files for the set of software from a software repository.

9. The non-transitory machine readable medium of claim 1, wherein the program further comprises a set of instructions for verifying that the executed step completed successfully.

10. The non-transitory machine readable medium of claim 9, wherein the program further comprises sets of instructions for:
   when the executed step does not complete successfully:
   undoing the executed step; and
   re-executing the step.

11. A method for orchestrating an instantiation of a system solution on a plurality of clouds, the method comprising:
   receiving a request from a user for the system solution;
   generating a blueprint, the blueprint comprising a plurality of steps for instantiating the system solution on the plurality of clouds the blueprint further comprising a connection schema associated with the plurality of clouds, the connection schema defining connections and interactions to be made between the plurality of clouds;
   for each step of the plurality of steps, executing the step on at least one of the plurality of clouds, wherein executing at least one step comprises converging a first cloud of the plurality of clouds and a second cloud of the plurality of clouds such that at least one first component of the first cloud is configured to directly communicate with at least one second component of the second cloud, and wherein the converging is determined based at least in part on the connection schema; and providing the user with access to the system solution.

12. The method of claim 11, wherein the plurality of steps comprises a set of steps for creating connections between the first cloud with the second cloud.

13. The method of claim 12, wherein the connections are between virtual machines instantiated on the first cloud and a set of services provided by the second cloud.

14. The method of claim 11, wherein executing the step comprises:
retrieving an installation script for installing a set of software from a script repository; and
using the installation script to install the set of software on a virtual machine on a cloud of the plurality of clouds.

15. The method of claim 14, wherein executing the step further comprises retrieving installation files for the set of software from a software repository.

16. The method of claim 14, wherein generating the blueprint comprises customizing a blueprint based on input received from the user in the request.

17. The method of claim 11 further comprising verifying that the executed step completed successfully.

18. The method of claim 17 further comprising:
when the executed step does not complete successfully:
undoing the executed step; and
re-executing the step.

19. The method of claim 11, wherein executing the step comprises:

accessing a state table to determine the state of the installation; and
determining whether to execute the step based on the state of the installation.

20. The method of claim 11 wherein providing access to the system comprises generating a response to the user in order to provide the access to the system solution.

21. A computing system, comprising:
one or more processors; and
one or more memory devices, the one or more memory devices storing computer-readable instructions that when executed by the one or more processors cause the one or more processors to perform operations, the operations comprising:
generating a blueprint, the blueprint comprising a plurality of steps for instantiating a system solution on the plurality of clouds, the blueprint further comprising a connection schema associated with the plurality of clouds, the connection schema defining connections and interactions to be made between the plurality of clouds;
for each step of the plurality of steps, executing the step on at least one of the plurality of clouds, wherein executing at least one step comprises converging a first cloud of the plurality of clouds and a second cloud of the plurality of clouds such that at least one first component of the first cloud is configured to directly communicate with at least one second component of the second cloud, and wherein the converging is determined based at least in part on the connection schema; and
providing access to the system solution.

* * * * *